United States Patent [19]
Ishida et al.

[11] Patent Number: 5,299,984
[45] Date of Patent: Apr. 5, 1994

[54] FRICTIONAL TRANSMISSION CHAIN

[75] Inventors: Hiroki Ishida, Tokorozawa; Masao Maruyama, Hanno; Masaru Morimoto, Hanno; Nobuyuki Fujimoto, Hanno, all of Japan

[73] Assignee: Tsubakimoto Chain Co., Osaka, Japan

[21] Appl. No.: 943,048

[22] Filed: Sep. 10, 1992

[30] Foreign Application Priority Data

Sep. 10, 1991 [JP] Japan .................................. 3-80764

[51] Int. Cl.⁵ .............................................. F16G 5/18
[52] U.S. Cl. .................................. 474/244; 474/247
[58] Field of Search ......................... 474/242, 244–247

[56] References Cited

U.S. PATENT DOCUMENTS

| | | | |
|---|---|---|---|
| 4,643,702 | 2/1987 | Cuypers | 474/242 |
| 4,795,409 | 1/1989 | Okuwaki et al. | 474/245 |
| 4,801,289 | 1/1989 | Sugimoto et al. | 474/215 |
| 4,906,225 | 3/1990 | van Lith | 474/242 |

FOREIGN PATENT DOCUMENTS

| | | |
|---|---|---|
| 73962 | 3/1983 | European Pat. Off. ............ 474/242 |
| 316544 | of 0000 | Japan . |
| 57-23820 | of 1982 | Japan . |

OTHER PUBLICATIONS

Japanese Laying-Open Gazette Application 99142/1984.
Japanese Laid Open Utility Model Application 4-84847 (referred to as Jap. Laid Open Utility Model Application 126443/1990 in U.S. Pat. Appln. Ser. No. 07/973,637.

Primary Examiner—Ramon S. Britts
Assistant Examiner—Roger J. Schoeppel
Attorney, Agent, or Firm—Howson & Howson

[57] ABSTRACT

A frictional transmission chain drive for use between V-groove pulleys comprises a series of C-shaped chain struts and friction force struts superposed along the length of an endless transmission chain. The chain struts are fitted in grooves located across link plates of the chain, with their open ends alternately located on opposite sides of the transmission chain. The friction force struts are provided with recesses which grip the chain to prevent sideways movement of the struts relative to the chain. The friction force struts on opposite sides of a chain strut can have their open ends on the same said of the chain as the open end of the chain strut, or, alternatively, can have their open ends on the side of the chain opposite the side on which the open end of the chain strut is located.

1 Claim, 6 Drawing Sheets

FRICTIONAL TRANSMISSION CHAIN

BRIEF SUMMARY OF THE INVENTION

This invention relates generally to frictional transmissions for use in power transmissions capable of continuous speed variation. It relates more particularly to an improved endless frictional transmission chain suitable for transmitting driving power between V-groove pulleys at continuously variable speed ratios.

A typical endless frictional transmission chain drive of the prior art is disclosed in Laid-Open Japanese Patent Application No. 316544/1989. It includes a series of I-shaped struts superposed, one on another, in the longitudinal direction of the transmission, and connected to one another by a pair of chains, one on the left side and one on the right side, of the series of I-shaped struts. Each chain has interleaved link plates inserted in opposed recesses of the struts, the link plates of the respective left and right chains being in out-of-phase relation by one-half the pitch distance. The transmission is mounted between driving and driven pulleys, and transmits power from the driving pulley to the driven pulley by frictional contact between outer V-shaped end faces of lower blade sections of the struts and the surfaces of V-shaped grooves of the pulleys. Continuously variable drive ratios are achieved by complementary changes in the spacing between the halves of each of the two pulleys.

The prior art transmission drives have several disadvantages. Disposing the left and right transmission chains out of phase with each other by one-half the pitch distance, reduces the noise which occurs as the outer end faces of the lower blade sections of the I-shaped struts engage the frictional surfaces of the V-grooves of the pulleys. A strut which engages the link plates of one of the left and of the right transmission chains does not engage the link plates of other chains at all. Consequently, with the transmission load exerted only against the right or left blade sections of the struts, the struts act as cantilevers. Durability of the transmission is therefore diminished because of excessive loads applied to the struts and the link plates. It is very difficult to achieve equal tension in the left and right chains because of differences in coefficients of elongation of the chains. Moreover, tension tends to be concentrated on one of the two chains, decreasing its durability and causing pulsations to occur, which adversely effect smooth power transmission.

The principle object of this invention is to provide a frictional transmission chain drive of improved durability.

Another object of the invention is to reduce pulley-to-strut engagement noise by minimizing the number of struts required in a chain.

A further object of the invention is to improve the power transmission capability of the transmission chain drive.

Still a further object of the invention is to reduce the weight of the chain drive and to reduce its structural complexity.

These and other objects of the present invention are addressed in accordance with the invention by providing an endless frictional transmission chain drive comprising a series of C-shaped struts connected together in superposed relationship to one another, in the longitudinal direction on an endless transmission chain. The transmission struts are of two types: chain struts and frictional force transmitting struts. Upper and lower portions of the chain struts are fitted and locked in grooves located in the central part of upper and lower sides of link plates of the transmission chain, with the chain struts having openings alternately located on the opposite sides of the link plates. A group of abutting frictional force transmitting struts is installed between adjacent chain struts, with the openings of the mutually abutting force transmitting struts of each group being located on the opposite sides of the link plates, and with the upper and lower elements of the frictional force transmitting struts having cut-out sections for fitting and holding the upper and lower sides of the outermost link plates. A wide frictional force transmission surface is formed on both sides of the friction force transmitting struts for pressing against the V-groove surfaces of pulleys.

A frictional force strut which presses against the V-groove surface of a driving pulley receives power from the driving pulley. The same frictional force strut also presses against a chain strut to transmit power to the chain strut. The chain strut, in turn, engages the link plates of the transmission chain to transmit the power to the transmission chain. The driving power of the transmission chain is transmitted from the chain to a chain strut, and from the chain strut to a frictional force strut, which transmits the power to the V-groove surfaces of a driven pulley, thereby turning the driven pulley. Thus, the chain struts on the driving pulley are pushed by the frictional force struts to transmit power. In the straight-line span of the chain between the driving and driven pulleys, each link plate of the chain pulls the following link plate, thus transmitting power.

DETAILED DESCRIPTION

FIGS. 1-4 illustrate a prior art frictional transmission chain drive consisting of two endless transmission chains C1 and C2, formed of interleaved link plates L1 and L2. Chains C1 and C2 are disposed out of phase with each other one half their pitch distance, being engaged with I-shaped struts F1 and F2.

Figure 1:
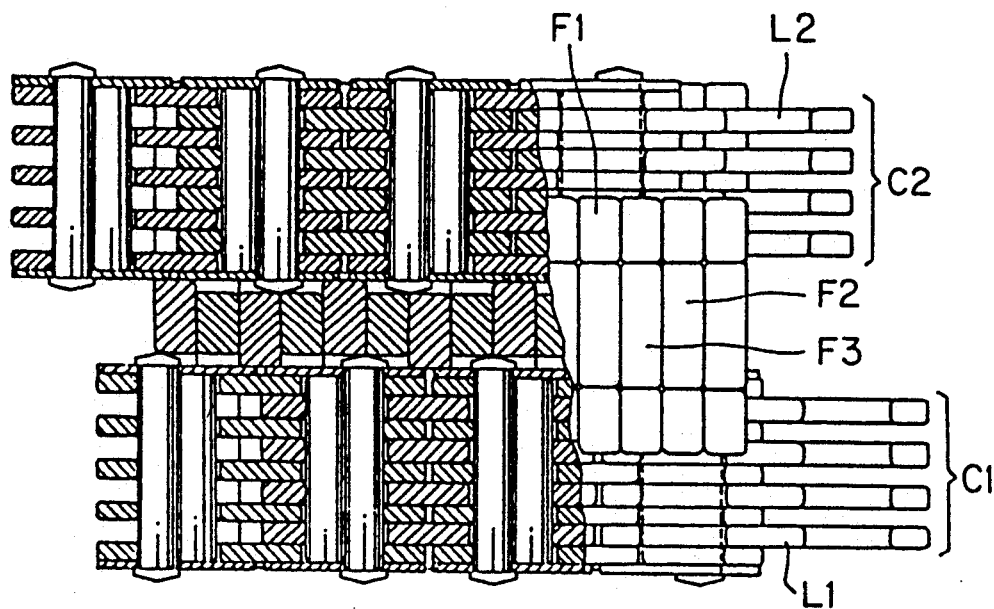
FIG. 1 is a plan view of a major portion of a prior art frictional transmission chain drive, shown partly in section.
Figure 2:
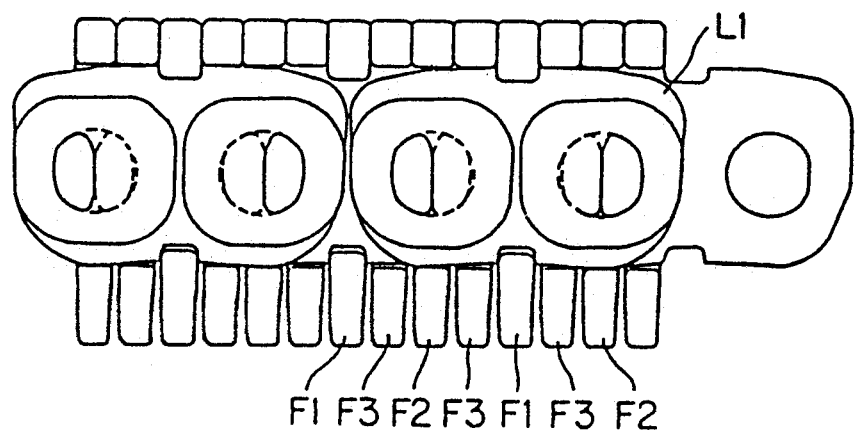
FIG. 2 is a side elevation of a portion of the frictional transmission chain drive of FIG. 1.
Figure 3:
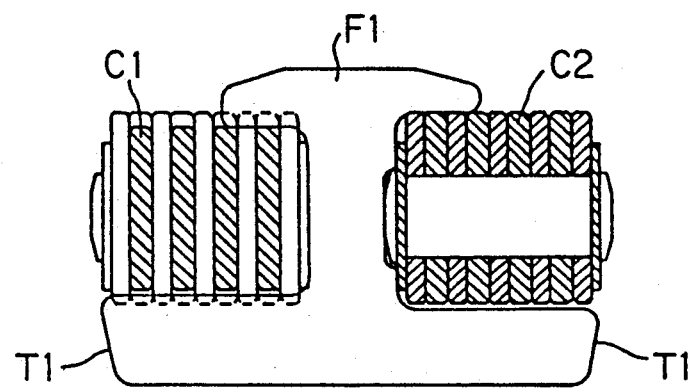
FIG. 3 is a transverse cross section of a prior art transmission of the kind shown in FIG. 1, showing a typical I-shaped transmission strut in elevation.

Upper and lower blade sections of the struts are fitted in recesses or notches formed in the central part of upper and lower sides of the link plates. Thus, as shown in FIGS. 3, the left side portions of upper and lower blade sections of strut F1 fit in central cutout notches of link plates L1 of transmission chain C1, while the right side portions do not fit in the central cutout notches of link plates of transmission chain C2. Similarly, the right side portions of upper and lower blade sections of strut F2 fit in the central cutout notches of link plates L2 of transmission chain C2, while left side portion of upper and lower blade sections do not fit in any central cutout notches of link plates of transmission chain C1. Consequently, only the left side portions of upper and lower blade sections of strut F1 are fitted in cutout notches of transmission chain C1, while only the right side portions of upper and lower blade sections of strut F2 are fitted in cutout notches of transmission chain C2.

Figure 4:
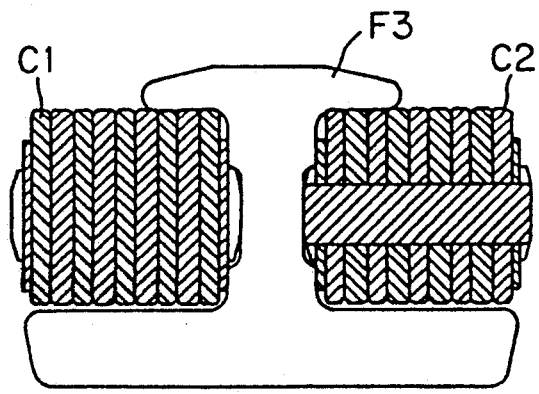
FIG. 4 is a transverse cross-section of a prior art transmission of the kind shown in FIG. 1, showing a typical I-shaped spacer strut in elevation.

Strut F3 is interposed between struts F1 and F2 to provide a spacer for filling the clearance between struts F1 and F2. As shown in FIG. 4, strut F3 is not engaged with either transmission chain C1 or C2.

A pulley (not shown) is engaged frictionally by end faces T1 on both sides of the lower blade sections of struts F1 and F2, which press against the conical surfaces of the V-grooves of the pulley. The traction force of a driving pulley is transmitted from struts F1 and F2, respectively, to transmission chains C1 and C2. Stepless speed variation is achieved by complementary increases and decreases of the V-groove spacings of the driving and driven pulleys.

Figure 7:
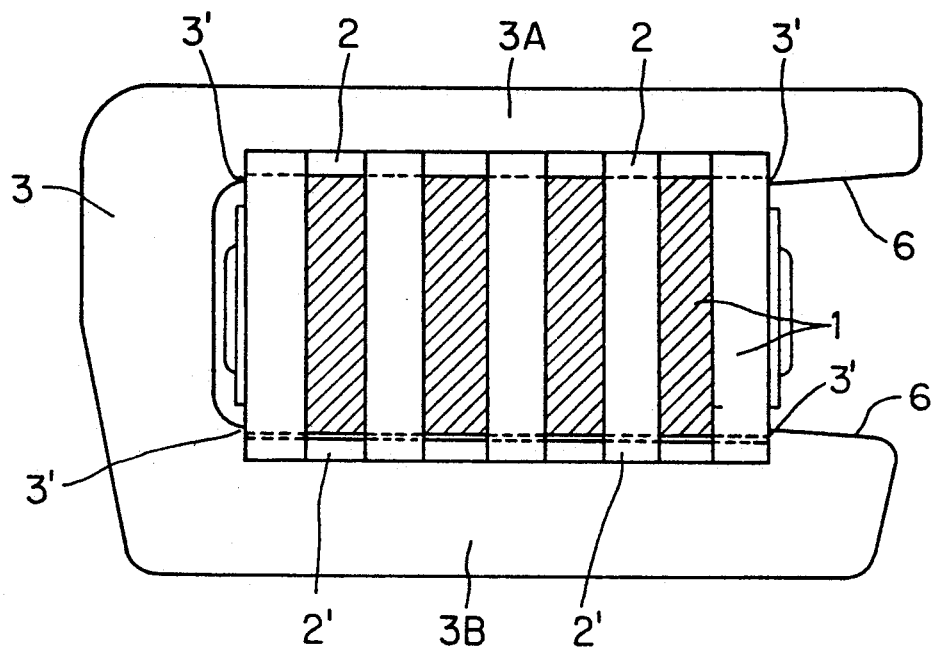
FIG. 7 is an enlarged side view of a chain strut mounted on link plates in the chain drive of FIG. 5.

Referring now to the inventive embodiment of FIGS. 5-8, there is shown a transmission chain C with chain struts 3 engaged in grooves 2 and 2' located in the central parts of upper and lower sides of link plates 1. As shown in FIG. 7, chain strut 3 has a C-shaped configuration, with upper and lower beams 3A and 3B, respectively. Formed at either end of the opposite inner sides of upper beam 3A and lower beam 3B are lock steps 3' which project on both sides of the link plates at grooves 2 and 2' to grip both outer sides of superposed link plates 1. Lock steps 3' also prevent chain strut 3 from shifting sideways on transmission chain C, and the engagement of beams 3A and 3B in grooves 2 and 2' prevents chain strut 3 from shifting on transmission chain C in the longitudinal direction.

Figure 8:
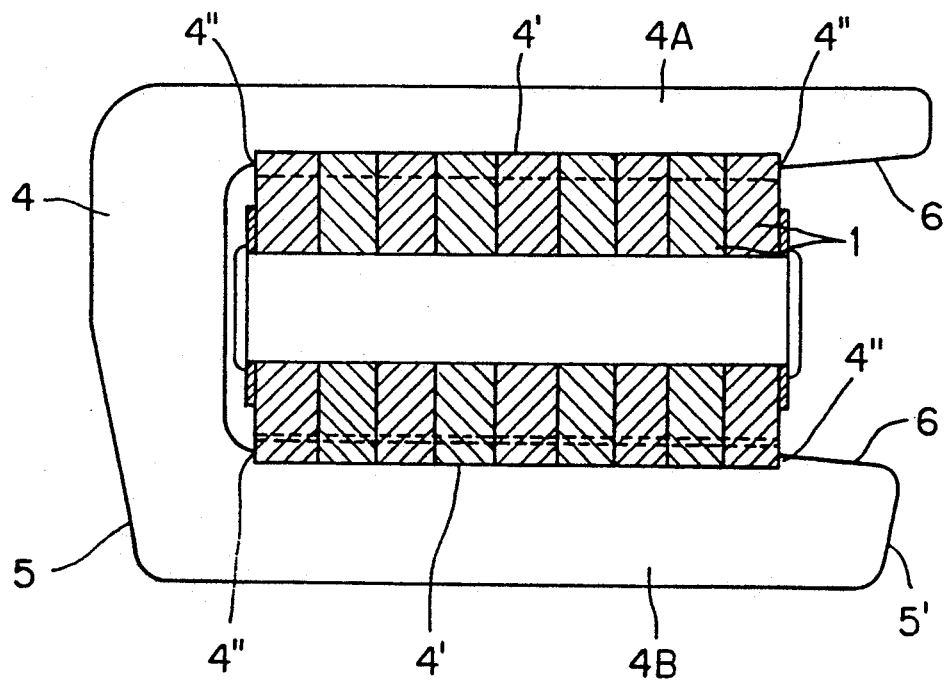
FIG. 8 is an enlarged side view of a frictional force strut mounted on the link plates in the chain drive of FIG. 5.

A frictional force strut 4, shown in FIG. 8, also has a C-shaped configuration. An upper beam 4A and a lower beam 4B have, at either end of their opposite inner sides, recesses 4' for fitting the upper and lower sides of the link plates 1. The outermost link plates of chain C are held by end shoulders 4" at the ends of recesses 4'. Frictional force struts 4 are free to shift in the longitudinal direction of transmission chain C, but not sidewalls.

Figure 5:
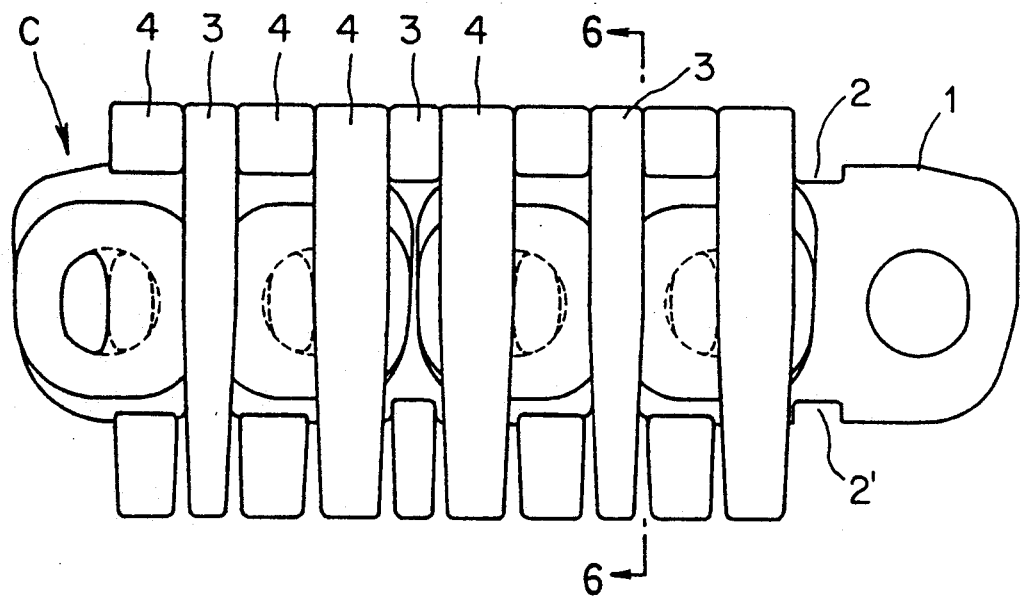
FIG. 5 is a side elevation of a portion of a frictional transmission according to one embodiment of the invention.
Figure 6:
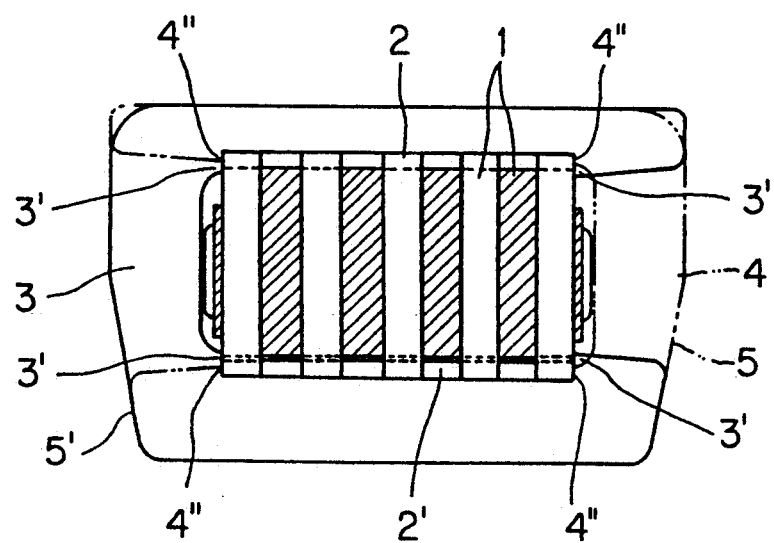
FIG. 6 is a sectional view of the chain drive of FIG. 5 taken on plane 6—6 thereof.

Chain struts 3 fit in the cutout grooves or notches 2 and 2' of link plates 1 with the open ends of the struts being located alternately on opposite sides of transmission chain C. In the embodiment of FIG. 5, the frictional force struts 4 are superposed on transmission chain C adjacent to both sides of each chain strut 3 with their open ends located on the side of transmission chain C opposite the open end of the adjacent chain strut 3.

Figure 9:
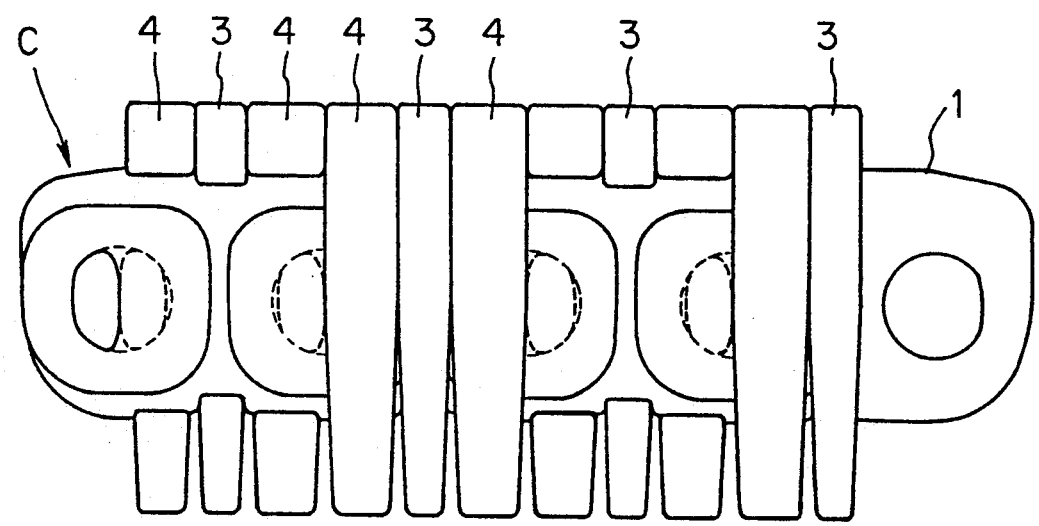
FIG. 9 is a side elevation of a portion of a frictional transmission chain drive according to another embodiment of the invention.

In the alternative embodiment shown in FIG. 9, the frictional force struts 4 adjacent to both sides of each chain strut 3 are superposed on transmission chain C with their open ends located on the same side of transmission chain C as the open end of the chain strut 3.

Figure 10:
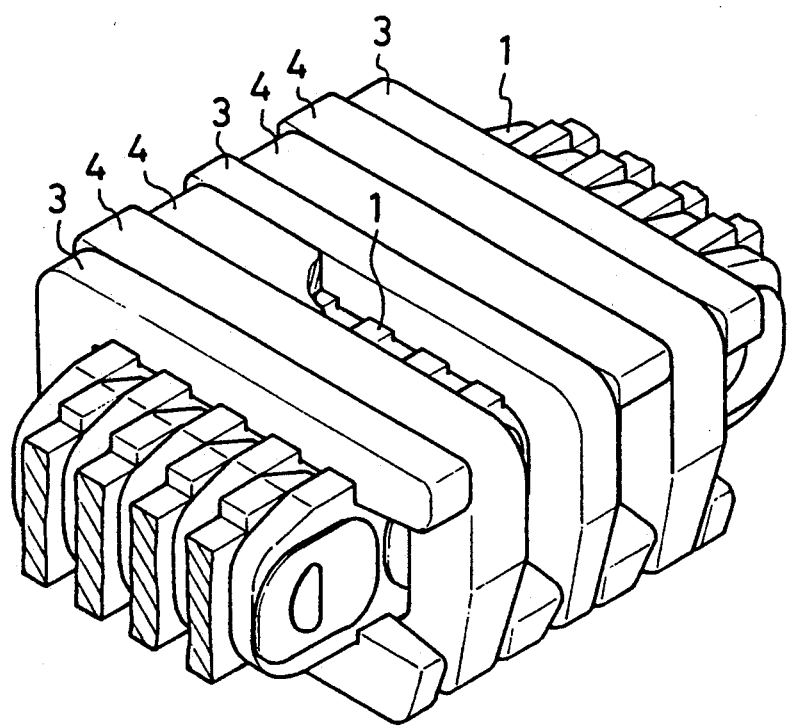
FIG. 10 is a partially broken away top perspective view of a portion of an assembled frictional transmission chain drive showing the relationship of the chain transmission struts, the frictional force transmission struts, and the chain links.

In both embodiments, transmission struts 3 and 4 are mounted from either side of transmission chain C, and side end faces 5 and 5' of lower beams 4B of the frictional force struts 4 press against the conical transmission surface of V-groove pulleys to establish friction transmission interfaces. As shown in FIG. 10, first struts 3 are directly engaged with the link plates by virtue of the fact that they are fitted in cutout grooves in the link plates. Second struts 4, on the other hand, which have faces 5 and 5' for frictionally engaging V-groove pulleys, are disposed in abutting relationship with one another between the successive first struts, with their openings provided alteratively on opposite sides of the transmission chain. Thus, rotation of a driving pulley is transmitted by friction through surfaces 5 and 5' of struts 4, which in turn push chain struts 3. The traction force is transmitted to transmission chain C by the engagement of chain struts 3 with cutout grooves 2 and 2' of link plates 1. The driving force of the transmission chain C is transmitted to the driven pulley through chain struts 3, which push against frictional force struts 4.

The frictional force to be transmitted may be increased by increasing the width of the frictional force struts 4 relative to chain struts 3, and struts 4 are preferably wider than struts 3, as shown in FIGS. 5 and 9.

Transmission struts 3 and 4 can be installed on a transmission chain C in the following manner. The struts are pushed onto transmission chain C from the sides of the outer link plates 1 by utilizing inclined surfaces 6 formed on the inner sides of the open ends of the struts, as shown in FIGS. 7 and 8. The engagement of the inclined surfaces 6 with the chain link plates causes the end of the strut to open resiliently, allowing the strut to snap onto the link plates.

The many advantages and new features of the invention should now be readily apparent. For example, C-shaped struts instead of I-shaped struts makes it possible to use a single transmission chain in place of two chains. This avoids the problem of uneven chain tension and improves durability. Furthermore, chain weight is reduced because no spacer struts are required. The ratio of the number of chain struts to frictional force struts is decreased to 1:2. This produces ½-pitch and ½-pitch irregular pulley-to-strut engagement periods, thereby reducing peak engagement noise. The efficiency of transmission is greatly improved because the chain struts and the frictional force struts are assigned special roles according to their functions, and consequently it is possible to increase the frictional transmission surface of the frictional force struts without increasing the dimensions of the other struts. The open ends of the chain struts alternately superposed on opposite sides of the transmission chain insure smooth and uniform transmission of frictional forces to the chain thereby offering remarkable advantages in practical use.

It will be understood that various modifications other than those specifically described can be made to the chain drive as described herein without departing from the scope of the invention as defined in the following claims.

We claim:

1. A frictional transmission chain for transmission of power between a pair of V-groove pulleys comprising: a transmission chain having a series of interconnected and interleaved link plates having upper and lower sides; and a plurality of struts superposed on one another in the longitudinal direction of the transmission chain; wherein said plurality of struts comprises first transmission struts directly engaged with the link plates, and second transmission struts for frictional engagement with V-groove pulleys, each of said struts having a channel-like configuration with an a opening on one side thereof; wherein each of said first transmission struts is fitted in cutout grooves provided at the central part of the upper and lower sides of link plates of said transmission chain, with successive first transmission struts having their openings provided alternately on opposite sides of the transmission chain; and wherein a plurality of said second transmission struts are installed, in abutting relationship with one another, between successive first struts, with the openings of abutting second struts being provided alternately on opposite sides of the transmission chain, each of said second struts having a cutout concave section for fitting and holding the upper and lower sides of the outermost link plates of the transmission chain, and wide frictional transmission surfaces on said second struts for pressing against V-groove transmission surfaces of V-groove pulleys.

* * * * *